(12) United States Patent  
Ostapovicz et al.

(10) Patent No.: US 8,977,814 B1  
(45) Date of Patent: Mar. 10, 2015

(54) INFORMATION LIFECYCLE MANAGEMENT FOR BINDING CONTENT

(71) Applicant: EMC Corporation, Hopkinton, MA (US)

(72) Inventors: Scott Ostapovicz, Franklin, MA (US); Stephen J. Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 291 days.

(21) Appl. No.: 13/630,495

(22) Filed: Sep. 28, 2012

(51) Int. Cl.  
*G06F 12/08* (2006.01)

(52) U.S. Cl.  
CPC ..................... *G06F 12/08* (2013.01)  
USPC .......................................................... 711/117

(58) Field of Classification Search  
None  
See application file for complete search history.

(56) References Cited

U.S. PATENT DOCUMENTS

| 7,451,225 | B1* | 11/2008 | Todd et al. | 709/229 |
| 7,526,553 | B1* | 4/2009 | Todd et al. | 709/226 |
| 7,565,493 | B1* | 7/2009 | Todd et al. | 711/137 |
| 7,565,494 | B1* | 7/2009 | Todd et al. | 711/137 |
| 8,219,724 | B1* | 7/2012 | Caruso et al. | 710/36 |
| 8,438,342 | B1* | 5/2013 | Todd et al. | 711/153 |

* cited by examiner

*Primary Examiner* — Kevin Verbrugge  
(74) *Attorney, Agent, or Firm* — Krishnendu Gupta; Joseph D'Angelo

(57) ABSTRACT

Some embodiments are directed to an object addressable storage (OAS) system that stores a plurality of objects, a method for use in an OAS system and at least one non-transitory computer readable storage medium encoded with instruction that, when performed by a computer perform a method for use in an OAS system. Each object may include a plurality of portions. A tiered storage environment comprising a plurality of storage tiers may be used. In response to a command a storage tier may be selected for each portion of the object. The OAS system may store at least one of the plurality of portions in a respective selected storage tier such that the object is stored in the OAS system with each of the portions being stored in its respective selected storage tier.

20 Claims, 10 Drawing Sheets

Prior Art

INFORMATION LIFECYCLE MANAGEMENT FOR BINDING CONTENT

TECHNICAL FIELD

The present invention relates to the storage of content in a computer system using a multiple tier storage system.

BACKGROUND

Some storage systems receive and process access requests that identify a data unit or other content unit (also referenced to as an object) using an object identifier, rather than an address that specifies where the data unit is physically or logically stored in the storage system. Such storage systems are referred to as object addressable storage (OAS) systems. In object addressable storage, a content unit may be identified (e.g., by host computers requesting access to the content unit) using its object identifier and the object identifier may be independent of both the physical and logical location(s) at which the content unit is stored (although it is not required to be because in some embodiments the storage system may use the object identifier to inform where a content unit is stored in a storage system). From the perspective of the host computer (or user) accessing a content unit on an OAS system, the object identifier does not control where the content unit is logically (or physically) stored. Thus, in an OAS system, if the physical or logical location at which the unit of content is stored changes, the identifier by which host computer(s) access the unit of content may remain the same. In contrast, in a block I/O storage system, if the location at which the unit of content is stored changes in a manner that impacts the logical volume and block address used to access it, any host computer accessing the unit of content must be made aware of the location change and then use the new location of the unit of content for future accesses.

One example of an OAS system is a content addressable storage (CAS) system. In a CAS system, the object identifiers that identify content units are content addresses. A content address is an identifier that is computed, at least in part, from at least a portion of the content (which can be data and/or metadata) of its corresponding unit of content. For example, a content address for a unit of content may be computed by hashing the unit of content and using the resulting hash value as the content address. Storage systems that identify content by a content address are referred to as content addressable storage (CAS) systems.

The eXtensible Access Method (XAM) proposal is a proposed standard, that employs content addressable storage techniques, that is being developed jointly by members of the storage industry and provides a specification for storing and accessing content and metadata associated with the content. In accordance with XAM, an "XSet" is a logical object that can be defined to include one or more pieces of content and metadata associated with the content, and the XSet can be accessed using a single object identifier (referred to as an XUID). As used herein, a logical object refers to any logical construct or logical unit of storage, and is not limited to a software object in the context of object-oriented systems.

Figure 1:
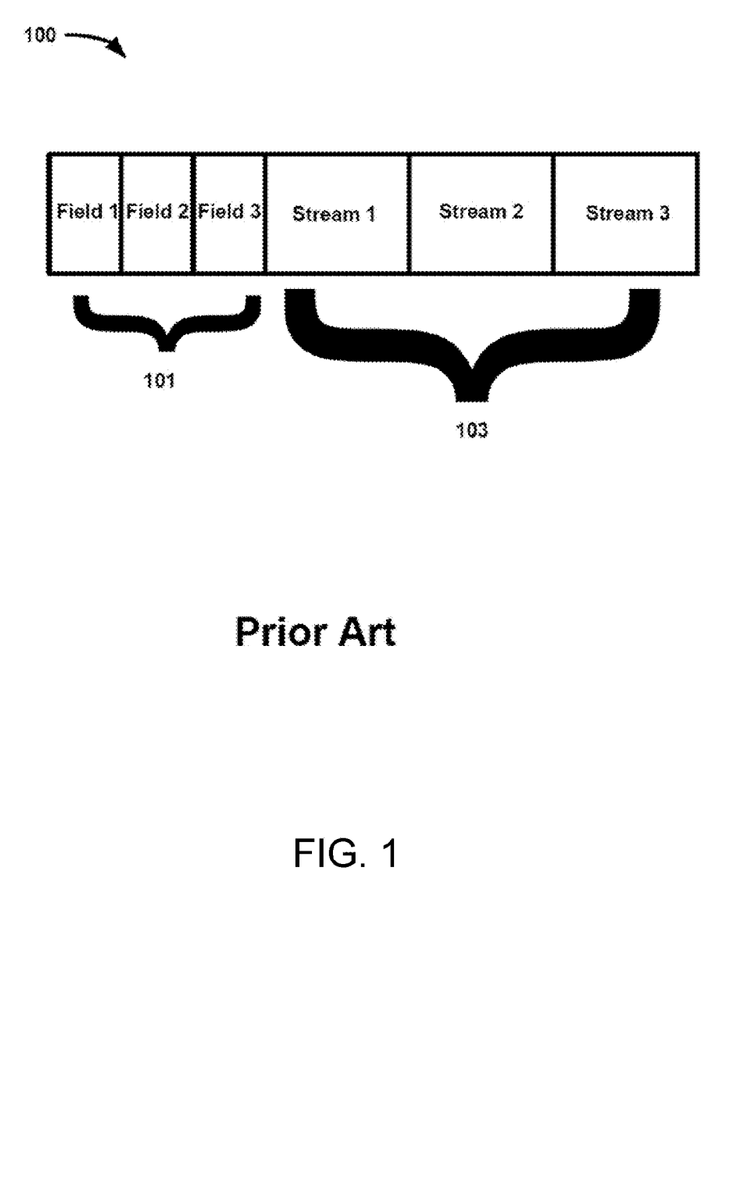
FIG. 1 is a diagram of an illustrative XSet that may be used in some embodiments.

As discussed above, an XSet can store one or more pieces of content. For example, an XSet can be created to store a photograph and the photograph itself can be provided as a first "stream" to the XSet. One or more files (e.g., text files) can be created to include metadata relating to the photograph, and the metadata file(s) can be provided to the XSet as one or more additional streams. Once the XSet has been created, a XUID is created for it so that the content (e.g., the photograph) and its associated metadata can thereafter be accessed using the single object identifier (e.g., its XUID). A diagram of an illustrative XSet 100 is shown in FIG. 1. As shown in FIG. 1, XSet 100 includes a number of streams for storing user provided content and metadata. The XSet may also include a number of additional fields 103 that store other types of metadata for the XSet, such as, for example, the creation time for the XSet, the last access time of access of the XSet, and/or any retention period for the XSet.

In XAM, each field or stream in an XSet may be designated as binding or non-binding. Binding fields and streams are used in computing the XUID for the XSet, while non-binding fields and streams are not. That is, the XUID for an XSet is computed based on the content of the binding fields and streams (e.g., by hashing the content of these fields and streams), but not based on the non-binding fields and streams. The designation of certain fields and/or stream as binding may change. Re-designating as binding a field or stream that had been previously designated as non-binding causes the XUID for the XSet to change. Similarly, re-designating a field or stream as non-binding that had previously been designated as binding causes the XUID for the XSet to change.

Because the XUID for an XSet is generated using the content of the binding fields and streams, the binding fields and streams of the XSet cannot be changed once the field becomes binding (though these fields and streams can be re-designated as non-binding and then changed). A request to modify a binding field or stream will result in a new XSet with a different XUID being created.

Some storage systems have "tiers" implemented by storage devices with different storage characteristics. One tier may provide fast access to data and may serve as a transactional storage tier. Such a tier, for example, may be implemented with memory in a server that accesses the data or in a network attached storage (NAS) device. Another tier may be implemented with fixed content storage. Such a tier, for example, may be implemented with a tape or other bulk storage that can store large amounts of data inexpensively, but requires more time to access. A content addressable storage (CAS) system also may be used to implement a fixed content storage tier.

SUMMARY

Some embodiments are directed to a method for use in an object addressable storage (OAS) system that stores a plurality of objects. The objects, each with an associated object identifier, may be accessible using an object addressable interface. Each object may include a plurality of portions. The OAS system may be implemented in a tiered storage environment comprising a plurality of storage tiers. The OAS system may, in response to a command provided via the object addressable interface to access an object, select, for each of the portions of the object, a storage tier based on a value of a parameter specified for a respective portion of the plurality of portions. The OAS system may store at least one of the plurality of portions in a respective selected storage tier such that the object is stored in the OAS system with each of the portions being stored in its respective selected storage tier.

Some embodiments are directed to at least one non-transitory computer readable storage medium encoded with computer executable instructions that, when executed by a computer, perform a method. The method may include interfacing with an interface of an object addressable storage system to receive a command to access an object. The object may consist of a plurality of portions. The method may determine, for each of the portions of the object, a storage tier associated with the portion based on a value of a parameter specified for the portion. The method may then interface with a storage system implementing a respective determined tier to access the portion.

Some embodiments are directed to an OAS system with a plurality of storage tiers. The OAS system may include at least one computing device with an interface for accessing an object stored in the object addressable storage system. The computing device may be configured to manage storage of objects such that an object including a plurality of portions is stored with each of the plurality of portions in a respective storage tier of the plurality of storage tiers based on a respective value of a parameter specified for each of the plurality of portions.

The foregoing is a non-limiting summary of the invention, which is defined by the attached claims.

BRIEF DESCRIPTION OF THE DRAWINGS

Aspects of the invention are described with reference to illustrative embodiments and the following drawings in which like reference characters represent like elements, and wherein.

DETAILED DESCRIPTION

In certain embodiments, configuring an interface to an object addressable storage system to manage storage of different portions of an object in different tiers may improve use of each storage tier. In some embodiments, the tiers may include a fixed content tier and a transactional storage tier. In most embodiments, the fixed content tier may be implemented using a CAS system.

In at least some embodiments, the interface may manage storage of portions of an object based on respective values of a parameter associated with the portions of the object. In most embodiments, such management may include, upon writing the object, selecting a tier for each portion and routing that portion to a storage device implementing that tier. In an embodiment, management may also include, upon reading the object, accessing a tier for each portion and assembling the object from data read from each of multiple tiers. In some embodiments, such management may also include, upon detecting a change in a value of a portion, migrating data for a portion from one tier to another. In further embodiments, such management may occur transparently to an application or other component, such as an application programming interface, accessing the object addressable storage system.

In an embodiment the values of the parameter may indicate whether the associated portions are binding or non-binding. In certain embodiments, these values may be assigned by an application or other component owning or otherwise accessing the object. In at least one embodiment, these values may be updated through the lifecycle of the object.

In particular embodiments, an object may be a document, such as a mortgage application that is accessed by a computer application program running on a mortgage broker's computer. In some embodiments, the document may have different sections, which may be associated with the different portions of the object. In certain embodiments, during the application process, before the closing of the mortgage agreement, the mortgage broker may use the application program such that certain terms of the mortgage application may change, such as the interest rate, the down payment amount, the type of loan or some other aspect of the mortgage. In other embodiments, the application program may set the value of the parameter associated with these portions of the mortgage application document to indicate that these portions are non-binding, as they are likely to change. In at least some embodiments, other terms of the mortgage remain static throughout the application process, such as the name of the lender and the borrower, and the boilerplate language of the application. In one embodiment, the value of the parameter associated with these portions of the mortgage application document may indicate that these portions are binding, as they will likely remain the same. In certain embodiments, after the closing of the mortgage, the non-binding portions will become static and will no longer change. In most embodiments, a user, the application program or another component may change the value of the parameter for the portions of the document from indicating the portions are non-binding to indicating the portions are binding.

In most embodiments, regardless of when and how these values are assigned or changed, the underlying storage of the portions may be transparent to the application or other component accessing the object. In alternative embodiments, portions of the object are stored efficiently by selecting a tier for different portions based on life-cycle information about each individual portion. In certain embodiments, portions containing data to be retained unchanged or for which an audit trail is desired may take advantage of the properties of a fixed content storage system. In other embodiments, if other portions are changed, multiple versions of data for the object are not created in the fixed content storage system. In at least some embodiments, portions containing data that is updated frequently may be readily accessible in a transactional storage system while still allowing other portions to take advantage of properties of a fixed content storage system, such as a CAS system.

In some embodiments, the parameter used to select the storage tier for portions of the object may be in any suitable form. In other embodiments the parameter may be an existing parameter that is part of an XAM specification. In most embodiments, techniques as described herein may be readily integrated into an object addressable storage system operating according to the XAM standard. In some embodiments, the read, write and migrate techniques described herein may be implemented as part of the object addressable interface. In some embodiments, techniques may be implemented as a plug-in to an existing interface which is otherwise configured to receive a plug-in to control access to a specific storage system.

Some embodiments described in the present application are directed to use of the XAM standard. Other embodiments may not use the XAM standard. Some embodiments relate to techniques for storing content that has both mutable and immutable portions (e.g., an XSet with some non-binding stream or fields and some binding streams or fields) across multiple storage tiers, including a tier implemented on a fixed content storage system and a tier implemented on a transactional storage system. In most embodiments, a fixed content storage system refers to a storage system that does not allow content stored thereon to be modified, unless an explicit command to delete the content is received. In some embodiments, if a request to modify a content unit stored on a fixed content storage system is received, the fixed content storage system creates a new content unit, rather than overwrite the content of the previous version of the content unit with the modified content. In most embodiments, each time the content unit is modified, a new version of the content unit is created on the fixed content storage system. In some embodiments, if it is desired to recover any content from a content unit that was modified, a previous version of the content unit having the desired data may be retrieved. In certain embodiments, a fixed content storage system may be a CAS system.

Certain embodiments described herein may refer to fixed content storage systems that are capable of implementing at least some aspects of the XAM standard. However, it should be appreciated that other embodiments may not use the XAM standard and may be used with any fixed content storage system.

In some embodiments, when a logical object is stored on a fixed content storage system, some or all of the content of the objects (e.g., fields or streams of an XSet in XAM) may be non-binding, thereby allowing the XSet to be modified after it is stored on the fixed content storage system. In most embodiments, each time one of these non-binding fields is modified a new version of the object (e.g., the XSet) is created. As a result, in most embodiments, if an object (e.g., an XSet) is modified frequently, a large number of versions of the object may be stored on the fixed content storage system, thereby consuming a large amount of storage space. In some embodiments, the problem is compounded when there are a large number of objects with non-binding portions that are being modified frequently.

In some embodiments, content is modified frequently until it is in a final state, after which it is desired that the content no longer be able to be modified. In certain embodiments, it may be desirable to initially designate one or more streams of an XSet as non-binding as the content of the streams is periodically being modified, but then designate the stream as binding once the content is in a desired final state. In some embodiments, other streams of an XSet may be set as binding from the beginning if it is unlikely to be changed. In certain embodiments, content that changes frequently may arise if a user is writing and revising drafts of a document that has multiple portions, such as the aforementioned mortgage application. In most embodiments, frequent modification to portions of the content may occur as the user revises and updates various drafts, but once the final draft is produced, it may not be modified again. In certain embodiments, other portions of the document, such as the boilerplate language, may be static the entire time. In some embodiments, while fixed content storage systems may be advantageous for storing content that is fixed (e.g. fix content storage systems may do so cost effectively), transactional storage systems may be better suited for storing content that changes frequently. In most embodiments, a transactional storage system may be a storage system in which content may be modified by overwriting or deleting a portion of the content, rather than creating a new version to store the modified content.

In some embodiments, for many real-life scenarios, objects may contain portions that are frequently updated and portions that are rarely modified. In certain embodiments, it may be desirable to store the portions of the object that are likely to be modified on a transactional storage system and store the rarely modified portion of the object on a fixed content storage system. Moreover, in some embodiments, the portions that are stored on the transactional storage system may be migrated to a fixed content storage system when the mutable portions become fixed.

Some embodiments may relate to storing an object with a plurality of portions, some mutable and some immutable, in a tiered storage system comprising more than one type of storage. In certain embodiments, the type of storage used and the location of each portion of an object may be automatically determined by the object addressable storage (OAS) system and be transparent to the user, application program, and/or a host computer interacting with the OAS system.

Some embodiments may relate to configuring and/or providing a storage policy that controls storage of portions of an object as between a transactional storage system (e.g., in which content may be readily modified) and a fixed content storage system based on at least one criteria relating to whether at least some portion of the content is binding (i.e., participates in the generation of the identifier for the content).

In some embodiments, the object may be a XAM XSet that is stored in a tiered storage system comprising a transactional storage system and a content addressable storage (CAS) system. In most embodiments, content units may be logical objects used to store content on a CAS system and are identified and accessed using content addresses. In many embodiments, a content address may be an identifier that is computed, at least in part, from at least a portion of the content (which may be data and/or metadata) of its corresponding unit of content. In some embodiments, a content address for a unit of content may be computed by hashing the unit of content and using the resulting hash value as at least a portion of the content address.

In some embodiments, when portions of an XSet are stored on a CAS system, the portions of the XSet may be represented by one or more content units on the CAS system. This may be done in any suitable way, as the invention is not limited in this respect. In some embodiments, the portions of the XSet stored on the CAS system may be represented on the CAS system using content units referred to herein as content descriptor files (CDFs) and blobs. In certain embodiments, content may be stored in a content unit referred to as a blob, which is identified on the CAS system by a content address computed, at least in part, from at least a portion of the content of the blob. In most embodiments, each blob has at least one associated CDF which stores the content address of the blob (i.e., as a pointer to the blob) as well as metadata associated with the blob. In some embodiments, the CDF may be independently accessible via its own content address. In many embodiments, by accessing the CDF, the content in the blob may be efficiently and easily accessed (via its content address that is included in the CDF) along with its associated metadata.

The embodiments above are examples for storing a XAM XSet using CDFs and blobs on a CAS system. In other embodiments, the current disclosure may not be limited to use with systems that uses CDFs and/or blobs to store logical objects, as objects which may be represented on a system in any suitable way.

In some embodiments, an object addressable storage (OAS) system may receive commands to access objects to be stored, or already stored, on the OAS system. In most embodiments, any suitable command may be received. In certain embodiments, a command may be a write command, a read command, or a command to change the value of a parameter associated with one or more portions of the object. In most embodiments, each portion of an object may be stored in a respective tier of the multi-tier OAS system.

In some embodiments, the tier selected for a particular portion of the object may be selected based on the value of a parameter associated with each portion. In certain embodiments, the value may be provided to the OAS system by an application program, or any other entity, that accesses the OAS system to store or retrieve an object. In some embodiments, any suitable form of parameter may be used. In certain embodiments, an integer may be used as the parameter, where each possible value of the integer directly corresponds to a tier of the OAS system. In other embodiments, a number may be used, and each tier of the OAS system may be associated with a particular range of numbers. In most embodiments, a portion of the object with a value of the respective parameter falling within the range associated with a particular tier may be stored in that tier.

In some embodiments, any suitable number of tiers may be used in a multi-tier OAS system. In certain embodiments, two tiers may be used. In certain embodiments, the first tier may be associated with mutable content and the second tier may be associated with immutable content. In most embodiments, mutable content may be non-binding, meaning the content is not used to generate the object identifier and immutable content may be binding, meaning the content is used to generate the object identifier. In some embodiments, the tier associated with mutable content may be implemented on a transactional storage system and the tier associated with immutable content may be implemented on a fixed-content storage system.

In some embodiments, more than two tiers may be used. In most embodiments, the tiers may be implements on any suitable type of storage. In certain embodiments, there may be a tier associated with a network attached storage (NAS) system, a flash memory storage system, a block storage system, a content addressable storage system, a redundant array of independent disks (RAID) storage system, a CD/DVD storage system, a magnetic tape storage system or a server storage system. In most embodiments, each type of storage system may be selected to store a portion of an object stored in the OAS system based on the benefits of each type of storage. In many embodiments, a NAS system is relatively quick, but may not provide as much protection against loss as a RAID storage system. In most embodiments, portions of the object that require extra protection against loss may be stored on RAID tier of the OAS system. Accordingly, in most embodiments, selection of a storage system on which to store a portion of an object may depend on many factors.

Figure 2:
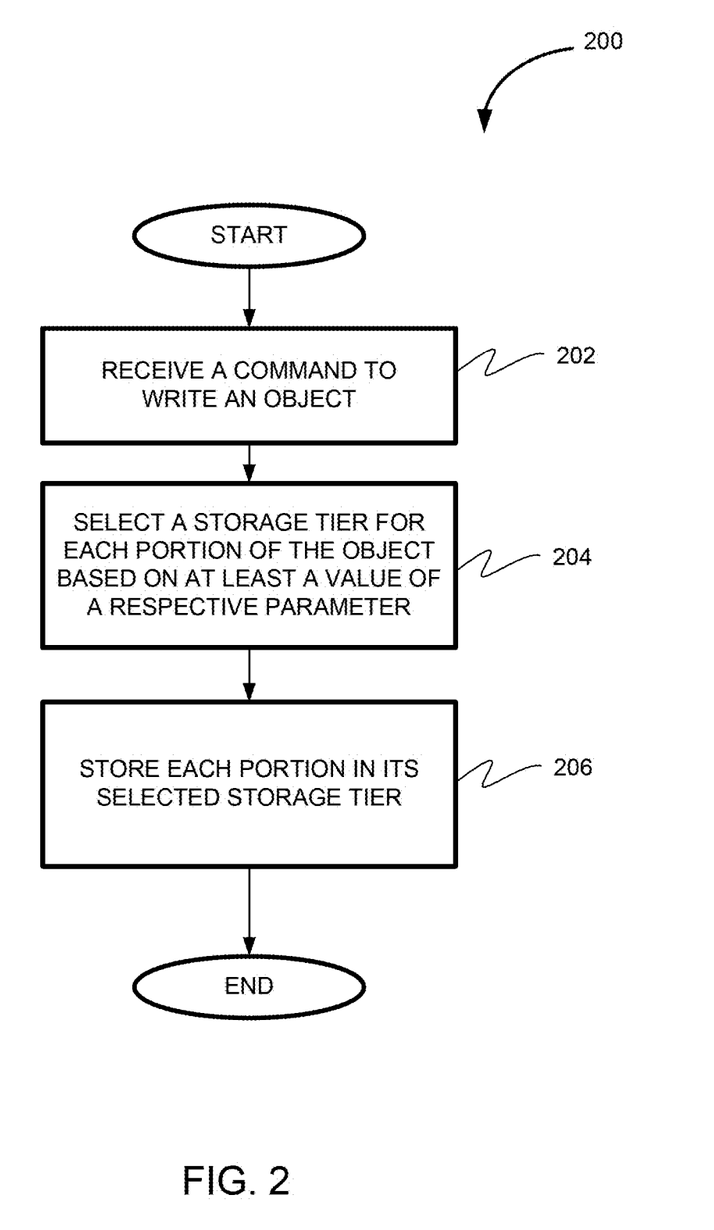
FIG. 2 is a flow chart of an illustrative process for writing an object to an OAS system, in accordance with some embodiments.

FIG. 2 illustrates an exemplary process 200 which may be implemented by an OAS system when a write command is received. At act 202 a write command is received. The write command indicates that an object is to be written to the OAS system. The command is received, for example, from a host computer executing an application program.

At act 204 a storage tier for each portion of the object is selected based on at least a value of a respective parameter associated with each portion of the object. This selection is made in response to receiving the write command. As discussed above, the parameter indicates a storage tier to store the respective portion of the object in any suitable way. At act 206, each portion of the object is stored in the respective selected storage tier.

FIG. 2 illustrates one embodiment of process 200. Other embodiments may differ in their implementation. For example, the selection at act 204 need not be in response to receiving the write command. Also, the command may be received at act 202 from a computer that does not execute an application program. In some embodiments, the parameter may directly indicate a storage tier to store the respective portion of the object. In other embodiments, the parameter may be processed to determine the appropriate storage tier for storing the respective portion of the object.

Figure 3:
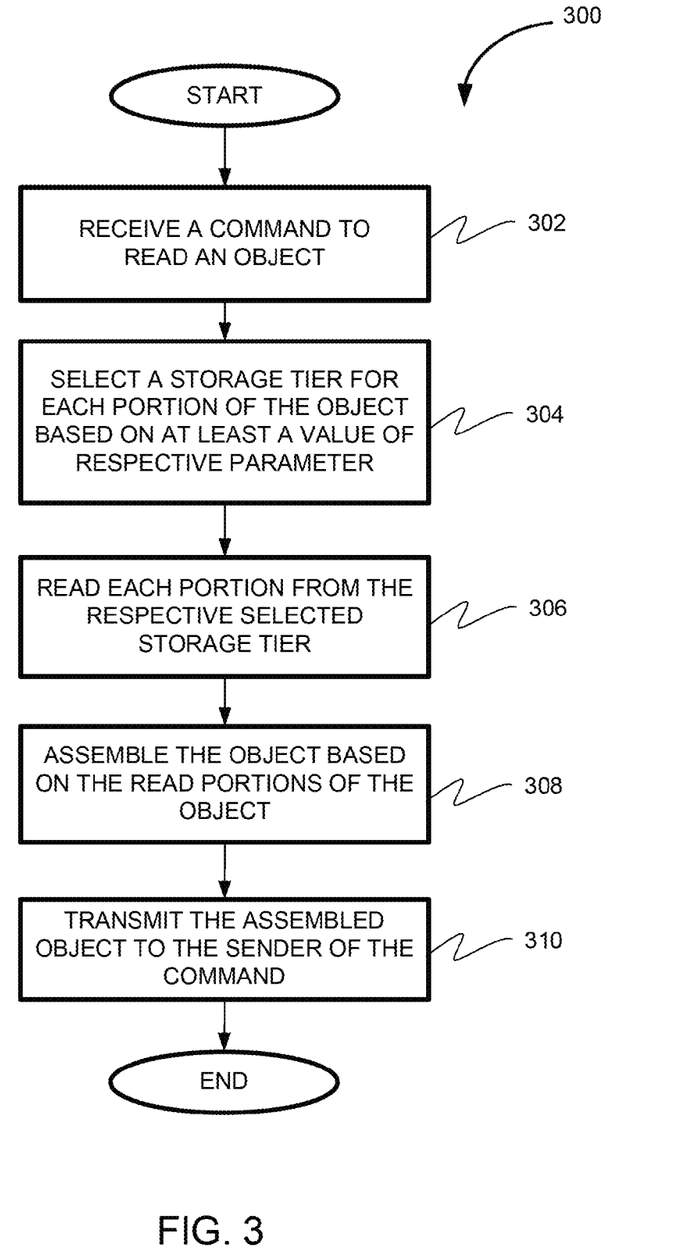
FIG. 3 is a flow chart of an illustrative process for reading an object stored on an OAS system, in accordance with some embodiments.

FIG. 3 illustrates an exemplary process 300 implemented by an OAS system when a read command is received, in accordance with some embodiments. At act 302 a command to read an object stored on the OAS system is received. The command identifies the object to be read using the object identifier of the object. The read command is received, for example, from a host computer executing an application program.

At act 304 a storage tier for each portion of the object is selected based on at least a value of a respective parameter associated with each portion of the object. This selection is made in response to receiving the read command. As discussed above, the parameter may indicate a storage tier to store the respective portion of the object in any suitable way. At act 306, each portion of the object is read from the respective selected storage tier. At act 308, the OAS system assembles the object based on the read portions of the object. The assembled object is sent to the sender of the read command at act 310.

FIG. 3 illustrates one embodiment of process 300. Other embodiments may differ in their implementation. For example, the selection at act 304 need not be in response to receiving the read command. Also, the command may be received at act 302 from a computer that does not execute an application program. In some embodiments, the parameter may directly indicate a storage tier from which to read the respective portion of the object. In other embodiments, the parameter may be processed to determine the appropriate storage tier for reading the respective portion of the object. In some embodiments, the object may be an XSet. As such, the object identifier specified in the command may be the associated XUID.

Though FIG. 3 describes the object being assembled at the OAS system and then sent to the sender of the command, embodiments of the invention are not so limited. For example, each portion of the object may be sent to the sender of the read command as each portion is read from its respective storage tiers. The object may then be assembled at the sender device, which may be, for example, a host computer executing an application program.

Figure 4:
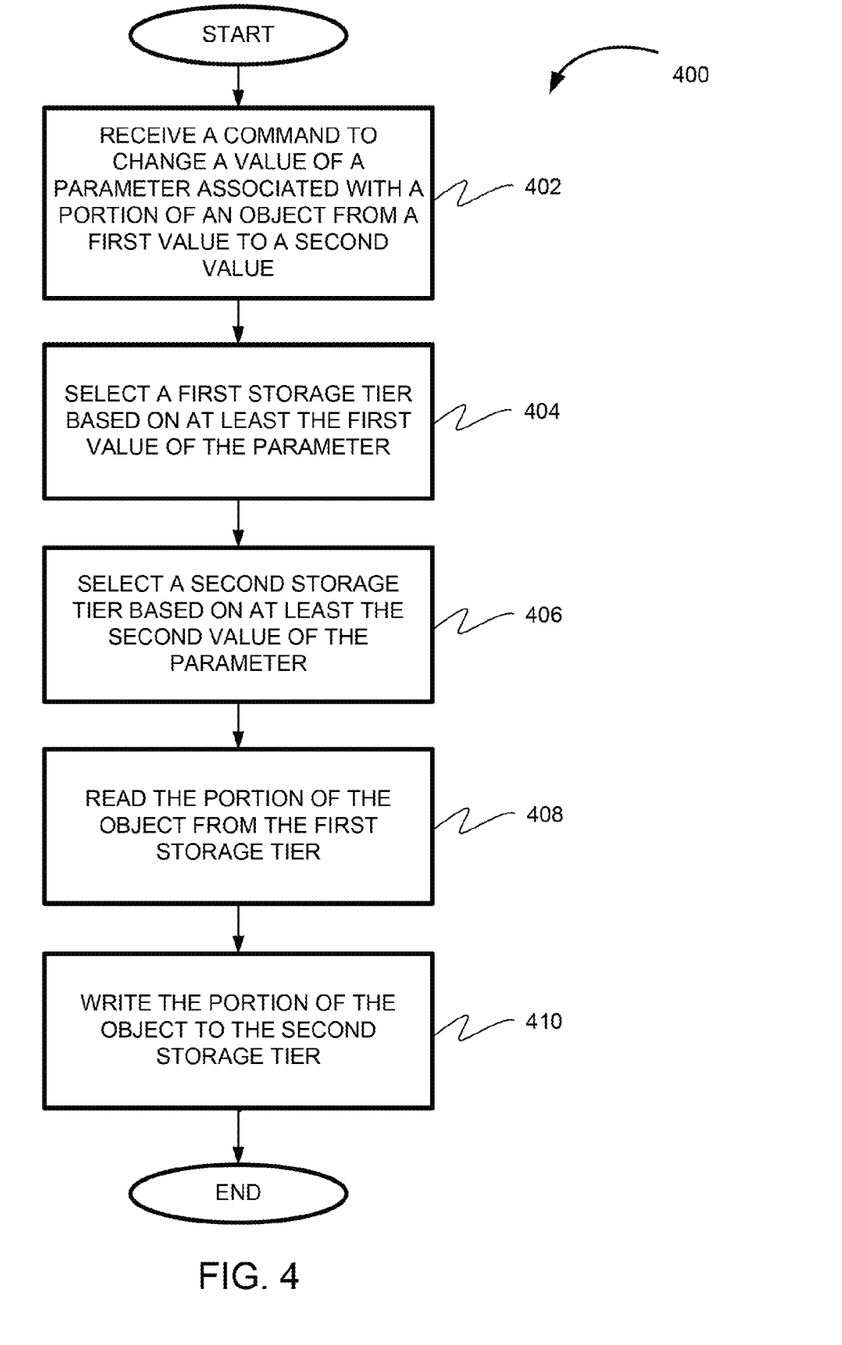
FIG. 4 is a flow chart of an illustrative process for migrating a portion of an object stored on an OAS system from a first tier to a second tier, in accordance with some embodiments.

FIG. 4 illustrates an exemplary process 400 which may be implemented by an OAS system when a command to change a value of a parameter associated with at least one portion of an object stored on the OAS system is received. At act 402 a command is received. The command indicates at least one portion of the object, a first value of the respective parameter indicating the current value of the parameter, and a second value of the respective parameter indication the updated value of the parameter. The command is received, for example, from a host computer executing an application program.

At act 404 a first storage tier for the indicated portion of the object is selected based on at least the first value of the respective parameter associated with the indicated portion of the object. This selection is made in response to receiving the command. As discussed above, the first value of the parameter indicates a first storage tier where the respective portion of the object is currently stored. At act 406, a second storage tier for the indicated portion is selected based on at least the second value of the respective parameter associated with the indicated portion of the object. As discussed above, the second value of the parameter indicates a second storage tier to which the respective portion of the object should be migrated. At act 408, the portion of the object is read from the first storage tier. At act 410, the OAS system writes the portion of the object to the second storage tier.

Figure 5:
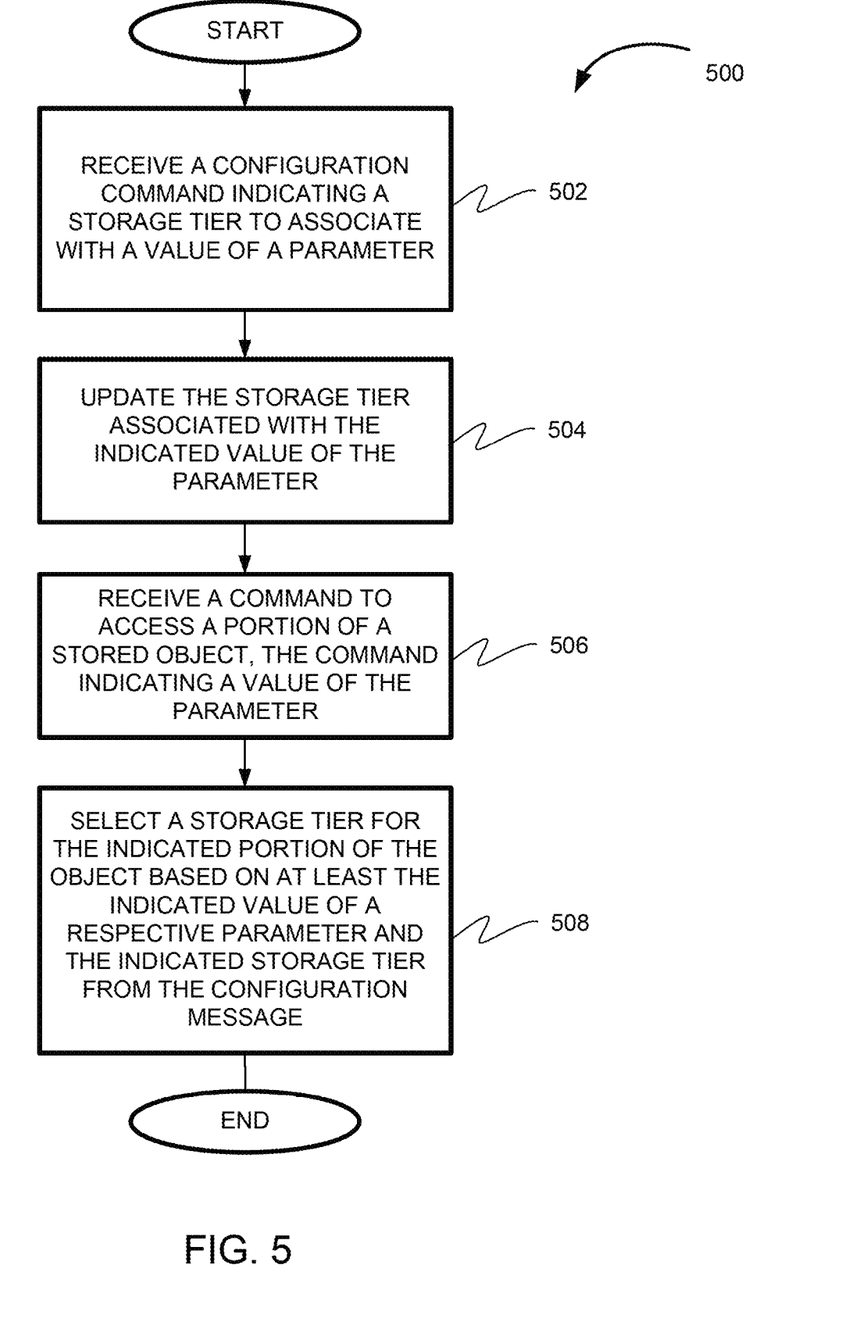
FIG. 5 is a flow chart of an illustrative process for receiving a configuration command at an OAS system, in accordance with some embodiments.

FIG. 5 illustrates an exemplary process 500 which may be implemented by an OAS system when a configuration command is received. Such a command establishes a policy used for selecting specific storage systems for portions of stored objects. At act 502 a configuration command indicating a storage tier to be associated with a value, or range of values, of a parameter may be received. At act 504, the OAS system updates a policy store, or other suitable representation of the policy, to indicate the storage tier associated with the value, or range of values, to the storage tier indicated by the command.

At act 506, the OAS system receives a command to store at least one portion of an object. The command may indicate a value of the respective parameter associated with the at least one portion of the stored object. At act 508, the OAS system selects a storage tier for the indicated portion of the stored object based on at least the indicated value of the parameter from the command and the indicated storage tier associate with this value from the configuration message.

FIG. 5 illustrates one embodiment of process 500. Other embodiments may differ in their implementation. For example, the selection of a storage system for different portions of an object may be performed when an object is stored, or at any other suitable time. In accordance with some embodiments, a migration policy may be employed that controls migration of content stored on a transactional storage system (e.g., in which content may be modified) to a fixed content storage system based on at least one criterion indicating that at least some portion of the content is binding (i.e., participates in the generation of the identifier for the content) or vice versa. This may be done in any suitable way, as aspects of the invention related to performing such migration are not limited to any particular implementation technique.

Figure 6:
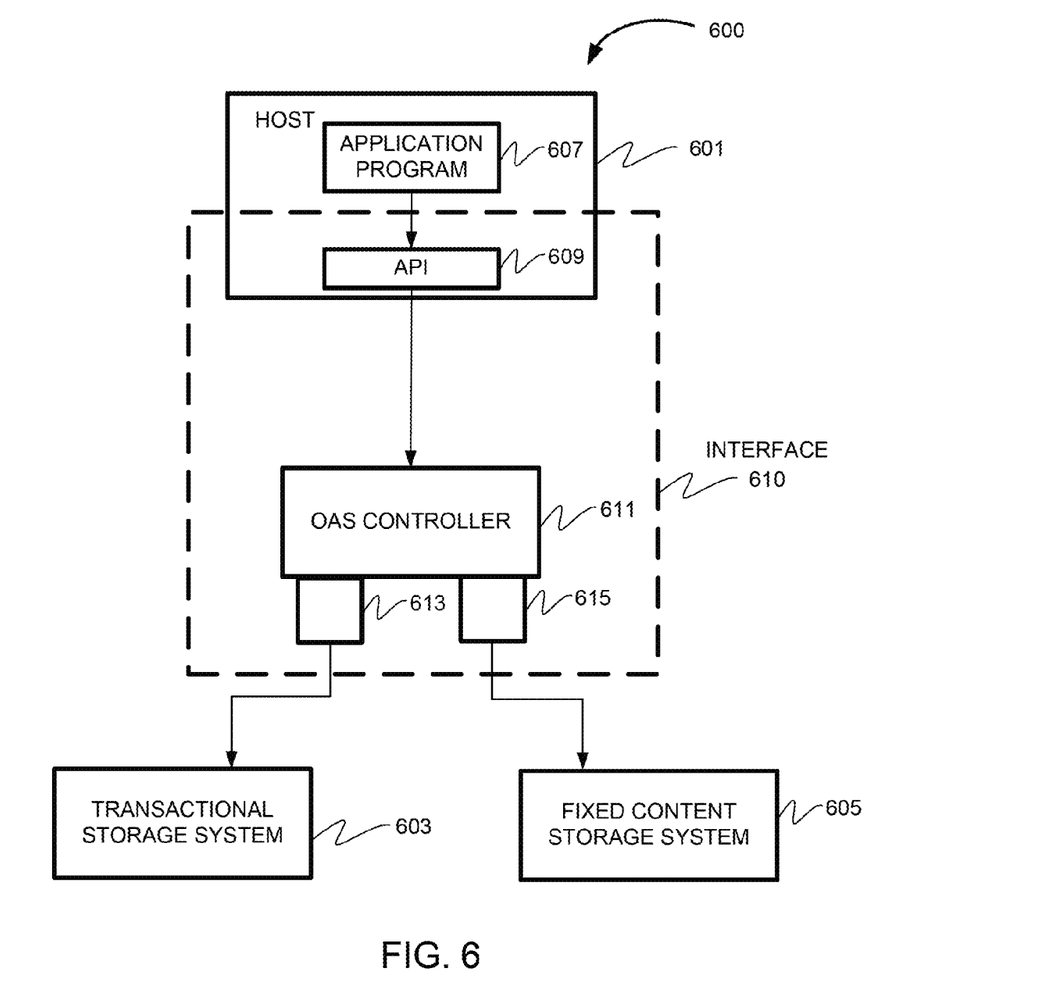
FIG. 6 is a block diagram of an illustrative system in which an OAS controller controls storage of content and migration of content between a transactional storage system and a fixed content storage system, in accordance with some embodiments.

FIG. 6, an OAS system 600 of one embodiment which includes a host computer 601 that executes an application program 607, a transactional storage system 603, and a fixed-content storage system 605. The OAS system 600 also includes an OAS controller 611 that controls the interaction between the host 601 and the storage systems, as well as controlling migration of content between the transactional storage system 603 and the fixed-content storage system 605. The OAS controller 611 communicates with the transactional storage system 603 and the fixed-content storage system 605 via plug-ins 613 and 615, respectively. Application program 607 communicates with transactional storage system 603 and/or fixed content storage system 605 through OAS controller 611 via one or more application programming interfaces (APIs) 609.

However, the specific partitioning of functions illustrated in FIG. 6 is only an example and not a requirement of the invention. In some embodiments, the API 609 may implement some or all of the functions of the OAS controller 611, in which case the API may communicate directly with the transactional storage system 603 and the fixed-content storage system 605. Transactional storage system 603 may be, for example, any suitable type of non-archive storage system, but embodiments are not limited in this respect. For example, transactional storage system 603 may be one or more file servers or network attached storage (NAS) devices, a database management system (DBMS), a block I/O storage system, or any other suitable type of transactional storage system.

Fixed content storage system 605 may be any suitable type of fixed content storage system, as embodiments are not limited in this respect. For example, in some embodiments, fixed content storage system 605 may be a content addressable storage system. In some embodiments, the fixed content storage system may be implemented as in any of the embodiments described above (e.g., to implement XAM, a CDF/blob architecture, and/or versioning), but the invention is not limited to use with a fixed content storage system of any of those types. Access to the OAS system of FIG. 6 may be through object-addressable interface 610.

OAS controller 611 may control selection of storage of portions of objects between transactional storage system 603 and fixed content storage system 605 based on whether portions of the object are indicated to be binding or not binding. This may be done in any suitable way, as the invention is not limited in this respect.

For example, plug-ins 613 and 615 may be used by the OAS controller 611 to interface with the transactional storage system 603 and the fixed-content storage system 605 via plug-ins 613 and 615, respectively. Such plug-ins may be implemented using known techniques. A different plug-in may be used for each type of storage system and/or for each different vendor of storage systems. By using plug-ins designed to interoperate with storage systems from a variety of vendors, a user of the OAS system 600 may use existing storage system hardware and software, including hardware or software from a variety of vendors, to implement an object-addressable storage system using techniques described herein.

The partitioning of functions illustrated in FIG. 6 allows API 609, plug-ins 613 and 615, and storage systems 603 and 605 to be implemented using conventional techniques or components. Control of access to storage systems that store portions of the same object may be done through OAS controller 611. OAS controller 611 may interface with the conventional components using conventional interfaces. API 609, for example, may perform the functions of a conventional OAS system to receive commands to store and retrieve objects or to change metadata associated with these objects. API 609 may provide an application interface for object-addressable interface 610, allowing applications otherwise configured to operate with an object-addressable system to take advantage of storage techniques as described herein.

Figure 7:
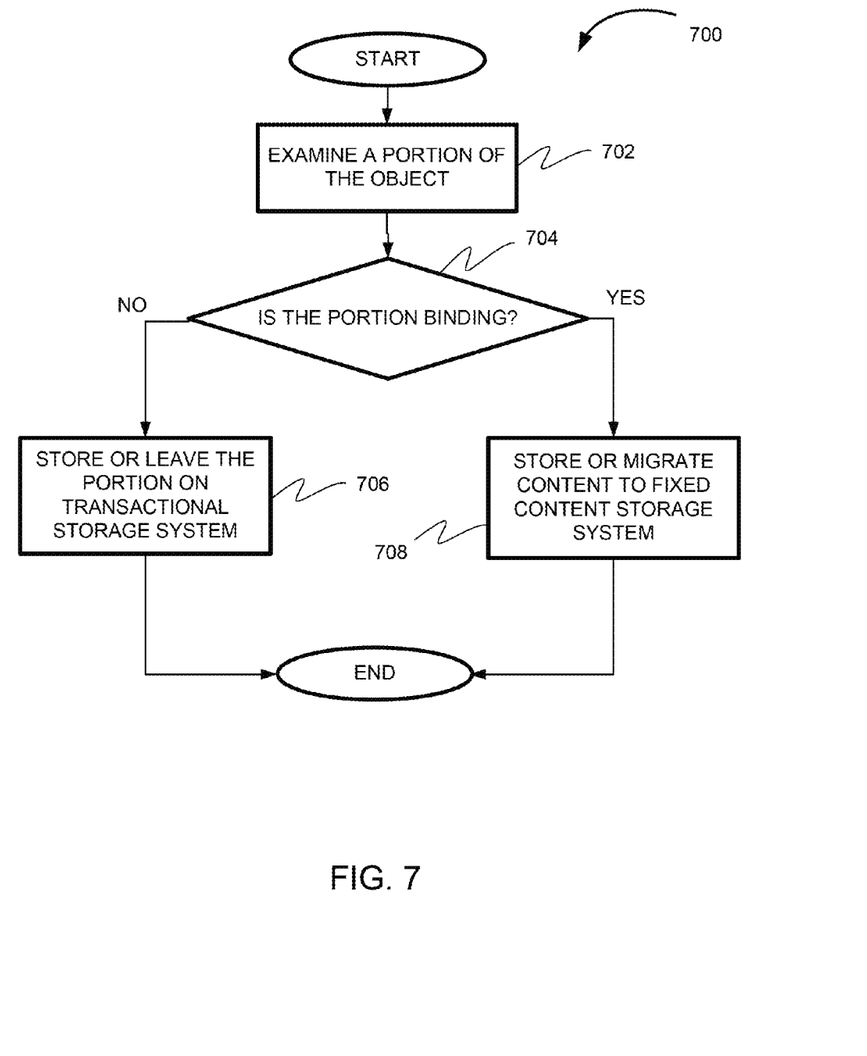
FIG. 7 is a flow chart of an illustrative process for determining whether to store a unit of content on a transactional storage system or a fixed content storage system, in accordance with some embodiments.

FIG. 7 shows an illustrative process 700 that OAS controller 611 may use, in some embodiments, to select either transactional storage system 603 or fixed-content storage system 605 to store a portion of an object, such as, for example, a field or stream of an XAM XSet or other object. At act 702, the portion of the object (e.g., an XSet) that is a candidate for being initially stored or migrated is examined. Process 700 is performed for multiple portions of an object, and in some embodiments may be performed for all portions of the object. The policy is applied at any time to determine whether to migrate previously stored portions of objects from one type of storage system to another. When migrating previously stored portions of objects, any suitable trigger for performing the process may be employed, examples of which are discussed below.

At act 704, it is determined whether the portion of the selected object is binding. This is done, for example, by examining a value of a parameter set for the portions of the object. If, at act 704, it is determined that the portion of the object is not binding, the process 700 continues to act 706, where the portion of the object is stored on the transactional storage system in act 706. Alternatively, if the portion of the object is already stored on the transactional storage, the portion of the object may be left on the transactional storage system.

If, at act 704, it is determined that the portion of the object is binding, the process continues to act 708, where the portion of the object is stored on the fixed content storage system or, if the portion of the object is stored on the transactional storage system, migrated from the transactional storage system to the fixed content storage. As mentioned above, the OAS controller 611 may examine a portion of the object in response to any suitable trigger, as the invention is not limited in this respect. For example, in some embodiments, the portion of the object may be examined in response to an application program sending a request to initially store the object to the OAS system. In some embodiments, the OAS controller 611 alternatively or additionally may select a portion of an object in response to the application program sending a request to alter designation of the portion of the object from non-binding to binding, or vice versa. In some embodiments, the OAS controller 611 may periodically scan portions of objects stored on the transactional storage system (e.g., as a background process) and select portions of objects to be examined in this way. Any other suitable way of triggering the process to examine an object, or a portion of an object, may be used.

In the specific embodiment illustrated in FIG. 7, at act 704, the OAS controller 611 makes a determination that will impact where to store and/or whether to migrate a portion of an object based on whether the portion of the object is binding. However, this is only one example of a criterion or criteria that the OAS controller 611 may use to determine where to store and/or whether to migrate a portion of an object, as any suitable criterion or criteria may be used, and aspects of the invention related to determining where to store or migrate a portion of an object are not limited in this respect. For example, in some embodiments, OAS controller 611 may initially store a portion of an object on the fixed content storage system or migrate a portion of as object from the transactional storage system to the fixed content storage system only if all of the portions of the object is binding, or if the amount of the object that is binding exceeds a certain threshold (e.g., in terms of size, number of portions and/or percentage of the overall content of the object).

In some embodiments, the OAS controller 611 may migrate a portion of an object from the transactional storage system to the fixed content storage system based on an amount of time that the portion of the object has been stored on the transactional storage system. For example, in some embodiments, if the amount of time that a portion of an object that has been stored on the transactional storage system exceeds a certain threshold, the OAS controller 611 may migrate the portion of the object to the fixed content storage system. In some such embodiments, a portion of an object may be migrated regardless of whether the portion of the object is binding. As should be clear from the examples above, any suitable criterion or criteria may be used to select either the transactional storage system or fixed content storage system as the initial storage location for a portion of an object and/or to determine whether to migrate a portion of an object stored on the transactional storage system to the fixed content storage system.

For example, a portion of a logical object (i.e., a content unit) that is stored on a transactional storage system may be designated as non-binding and may be periodically modified by a user (e.g., using an application program). When the user is done modifying the portion of the logical object, the user may (e.g., via the application program) alter the designation of all, or a portion, of the non-binding portions of the object to binding. In response to the user setting these portions to binding, the OAS controller 611 may cause these portions, of the object to be migrated from the transactional storage system to the fixed content storage system.

In some embodiments, the criterion or criteria used by the OAS controller 611 may be user configurable, such that a user and/or system administrator may configure the system to specify under what circumstances a portion of an object is stored on and/or migrated to the transactional storage system and under what circumstance the portion of the object is stored on and/or migrated to the fixed content storage system.

Figure 8:
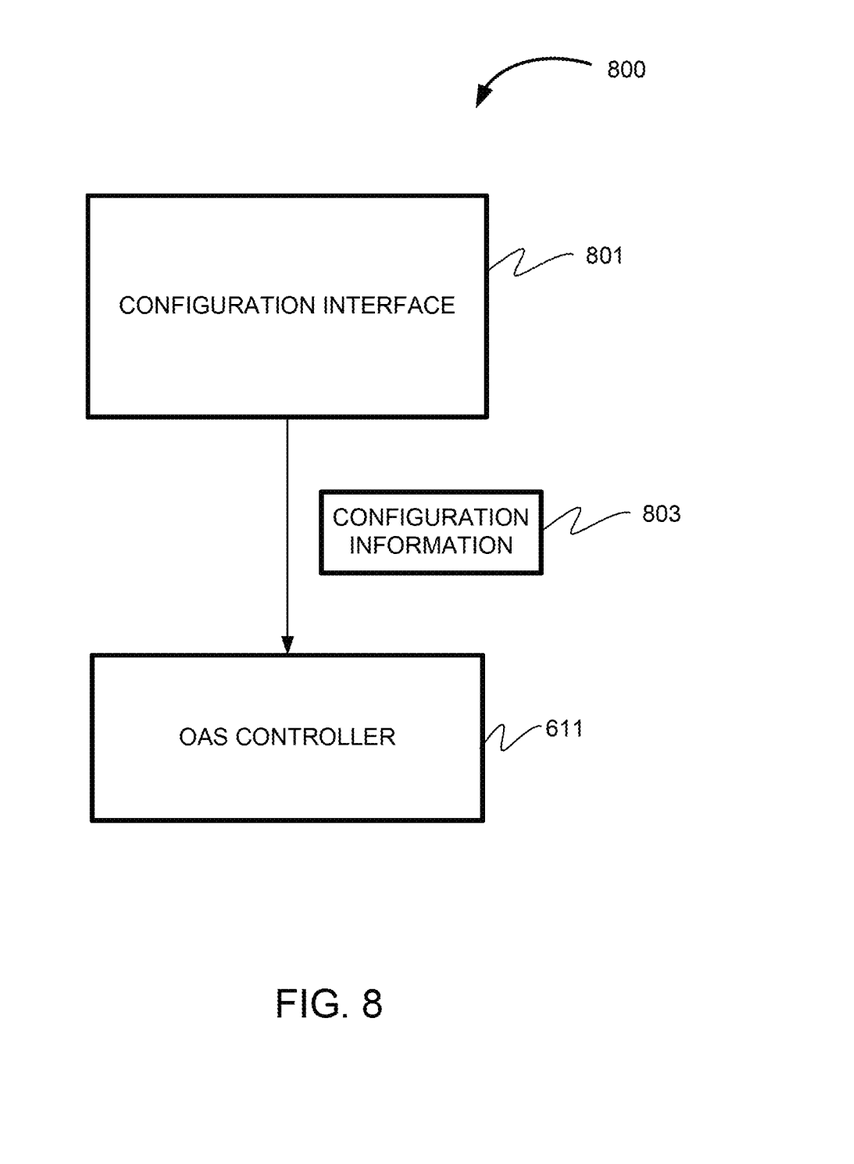
FIG. 8 is a block diagram of configuration interface for a OAS controller, in accordance with some embodiments.

For example as shown in FIG. 8, OAS controller 611 may have a configuration interface 801 by which a user and/or system administrator may send configuration information 803 to configure the migration policy implemented by the OAS controller 611. The user and/or system administrator may send configuration information to the configuration interface 801 from any suitable computer, including, but not limited to, the host computer 601. The configuration interface 801 may be used to periodically change the configuration of the migration policy.

Any suitable aspects of the migration policy may be configured. For example, any of the aspects of migration policy discussed above in connection with FIG. 7 may be configured (e.g., under what circumstances a portion of an object is stored on a particular storage system and/or migrated to a particular storage system). In addition, configuration interface 801 may be used, for example, to configure which storage system serves as the transactional storage system and which storage system serves as the fixed-content storage system. In some embodiments, OAS controller 611 may be configured (e.g., via the configuration interface) to apply different migration policies to different objects, or portions of objects, based on one or more characteristics of the object, or portion of the object. The policy applied to a particular portion of an object may be based on any suitable characteristic of the portion of the object, such as, for example, the source of the object (e.g., the application program or host computer that initially stored the content unit in the storage environment), the size of the object, or portion of the object, the time of storage of the portion of the object, or any other suitable characteristic.

In the embodiment illustrated in FIG. 6, object-addressable interface 610 is shown implemented as multiple components. However, embodiments are not so limited. These components may be implemented in any suitable way. The embodiment of FIG. 6 also illustrates the OAS controller 611 as a box between host computer 601 and storage systems 603 and 605. However, in other embodiments, OAS controller 611 may be implemented on any suitable system or combination of systems in computer system 600. For example, OAS controller 611 may be implemented on host computer 601, transactional storage system 603, fixed content storage system 605, an appliance coupled in between host computer 601 and storage systems 603 and 605, such as a NAS aggregator, via which access requests from host computer 601 are route to storage systems 603 and 605, and/or any combination thereof. In some embodiments, when OAS controller 611 is implemented entirely or in part in host computer 601, the OAS controller 611 may implemented in the API(s) 609 (e.g., as a vendor interface module) that the application program 607 uses to communicate with storage systems 603 and 605.

It should be appreciated that he above-described embodiments for storing binding and non-binding portions of objects in an OAS system and the above-described embodiments for configuring a migration policy and controlling migration of portions of objects between a transactional storage system and fixed-content storage system may be used separately or may be used together in any suitable way.

The above-described embodiments of the present invention can be implemented on any suitable computer, and a system employing any suitable type of storage system. Examples of suitable computers and/or storage systems are described in the patent applications listed below in Table 1 (collectively "the OAS applications"), each of which is incorporated herein by reference. It should be appreciated that the computers and storage systems described in these applications are only examples of computers and storage systems on which the embodiments of the present invention may be implemented, as the aspects of the invention described herein are not limited to being implemented in any particular way.

TABLE 1

| Title | Ser./Pat. No. | Filing/Issue Date |
| --- | --- | --- |
| Content Addressable Information, Encapsulation, Representation, And Transfer | 6,807,632 | Oct. 19, 2004 |
| Access To Content Addressable Data Over A Network | 09/235,146 | Jan. 21, 1999 |
| System And Method For Secure Storage Transfer And Retrieval Of Content Addressable Information | 6,976,165 | Dec. 13, 2005 |
| Method And Apparatus For Data Retention In A Storage System | 10/731,790 | Dec. 9, 2003 |

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 9:
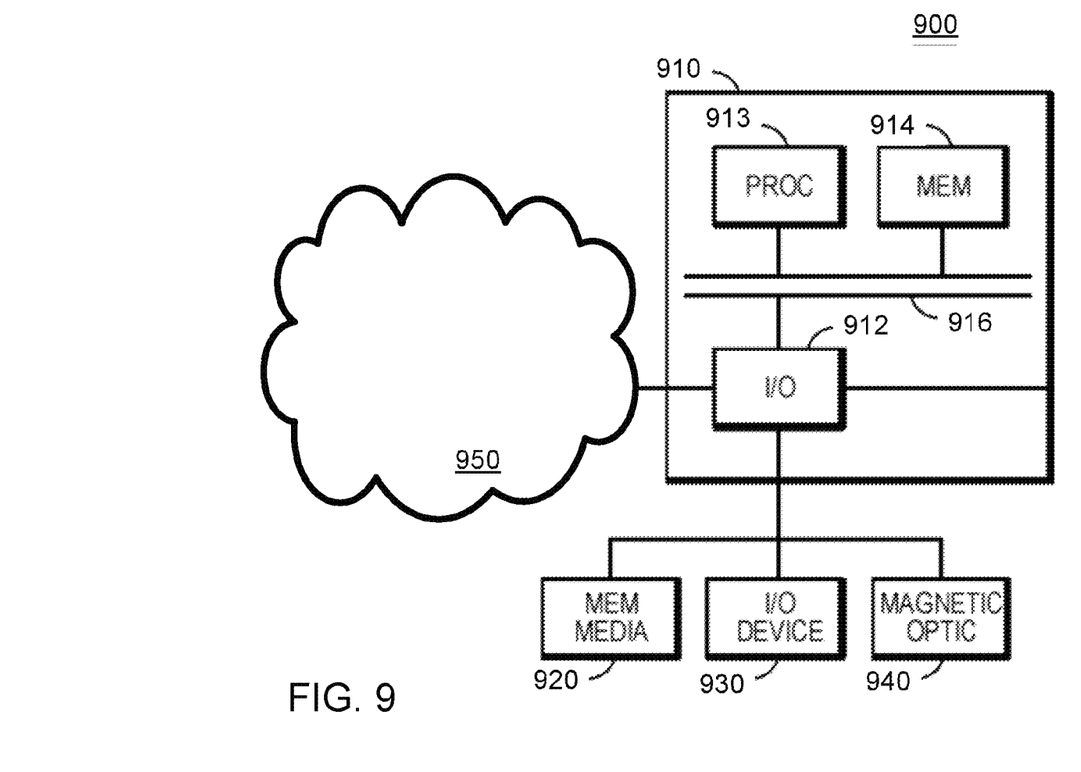
FIG. 9 is a diagram of an exemplary computing environment in accordance with some embodiments.

By way of example, FIG. 9 illustrates an exemplary computing environment 900 that may be used in some embodiments. The computer 910 comprises an input/output interface 912, a processor 913 and a memory 914. The components of computer 910 communicate via a bus 916.

Program code may be loaded onto computer 910 via any available input device. The input/output interface 912 allows computer 910 to communicate with memory media 920, input/output device 914 and magnetic/optic storage device 940. Program code may be loaded from any of these devices to memory 914 for execution by processor 913.

Input/output interface 912 also allows computer 910 to interface with network 950. As such, computer 910 may communicate with any other device attached to network 950, including host computers, OAS controllers and storage systems.

Figure 10:
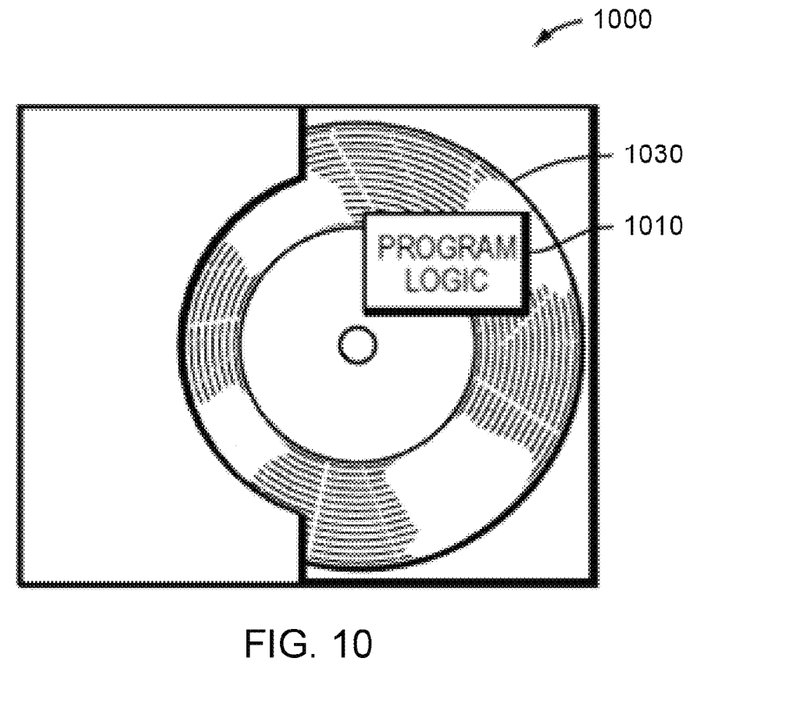
FIG. 10 is a diagram of an exemplary computer readable medium in accordance with some embodiments.

FIG. 10 shows program logic 1010 embodied on a computer-readable medium 1030 as shown, and wherein the logic is encoded in computer-executable code configured for carrying out the processes of this invention and thereby forming a computer program product 1000. The logic 1010 may be the same logic loaded on memory 914 and executed on processor 913. The program logic 1010 may also be embodied in software modules, as modules, or as hardware modules.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention may be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, in some embodiments, a computer may have one or more input and output devices. These devices may be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible format.

In some embodiments, such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, in some embodiments, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, in some embodiments, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media may be transportable, such that the program or programs stored thereon may be loaded onto one or more different computers or other processors to implement various aspects of the present invention as discussed above. As used herein, the term "computer-readable storage medium" encompasses only a computer-readable medium that may be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

In some embodiments, computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, in some embodiments, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for use in an object addressable storage system that stores a plurality of objects and provides an object addressable interface via which at least some of the plurality of objects are accessible, wherein an object accessible via the object addressable interface is accessible via an object identifier, and the object addressable storage system is implemented in a tiered storage environment comprising a plurality of storage tiers, the method comprising:
   in response to a command provided via the object addressable interface to access the object, selecting, for each of a plurality of portions of the object, a storage tier based on a value of a parameter specified for a respective portion of the plurality of portions; and
   storing at least one of the plurality of portions in a respective selected storage tier such that the object is stored in the object addressable storage system with the plurality of portions being stored in respective selected storage tiers.

2. The method of claim 1, wherein:
   the object is in an XAM object and each of the plurality of portions comprises a XAM stream.

3. The method of claim 2, wherein:
   the parameter has a value indicating whether the stream is binding or non-binding.

4. The method of claim 1, wherein:
   the plurality of tiers comprise a transactional storage tier and a fixed-content storage tier; and
   selecting a storage tier based on the value of the parameter comprises selecting the transactional storage tier when the parameter has a value indicating non-binding and selecting the fixed-content storage tier when the parameter has a value indicating binding.

5. The method of claim 1, wherein:
   the command comprises a command to write the object and the value of the parameter comprises an attribute specified in connection with the command.

6. The method of claim 1, wherein:
the command comprises a command to change the value of the parameter associated with a first portion of the object; and
storing at least one of the plurality of portions in the respective selected storage tier comprises migrating the first portion from a first tier of the plurality of tiers to a second tier of the plurality of tiers.

7. The method of claim 1, further comprising:
receiving the command through the object addressable interface in combination with values of the parameters specified for the plurality of portions of the object.

8. The method of claim 1, wherein:
the method further comprises receiving configuration commands, the configuration commands indicating storage tiers for different values of the parameter; and
selecting a storage tier for each of a plurality of portions of the object comprises selecting storage tiers based on the configuration commands.

9. At least one non-transitory computer readable storage medium encoded with computer executable instructions that, when executed by a computer, perform a method comprising:
interfacing with an object addressable interface of an object addressable storage system to receive a command to access an object;
determining, for each of a plurality of portions of the object, a storage tier associated with the portion based on a value of a parameter specified for the portion; and
for a portion of the plurality of portions of the object, interfacing with a storage system implementing a respective determined tier to access the portion of the plurality of portions.

10. The at least one non-transitory computer readable storage medium of claim 9, wherein:
the computer executable instructions for interfacing with the object addressable interface of the object addressable storage system to receive a command to access an object comprise computer executable instructions for receiving a read command, a write command and a command to change a value of the parameter for the portion of the object.

11. The at least one non-transitory computer readable storage medium of claim 10, wherein:
when the command received is a write command, interfacing with the storage system comprises interfacing with a respective storage system implementing a respective determined tier for each of the plurality of portions.

12. The at least one non-transitory computer readable storage medium of claim 10, wherein:
when the command received is a read command:
interfacing with the storage system comprises reading a respective portion from the storage system; and
the computer executable instructions further comprise instructions for, when the command is a read command, assembling the object based on portions read by interfacing with storage systems implementing respective determined tiers.

13. The at least one non-transitory computer readable storage medium of claim 10, wherein:
the storage system is a first storage system; and
when the command received is a command to change a value of the parameter for the portion of the object:
interfacing with the storage system implementing a respective determined tier to access the portion comprises reading the portion from the first storage system and storing the portion in a second storage system.

14. The at least one non-transitory computer readable storage medium of claim 10, wherein:
the computer readable storage medium further comprises a plurality of plug-ins; and
interfacing with the storage system implementing a respective determined tier comprises accessing a plug-in associated with the tier.

15. An object addressable storage system comprising a plurality of storage tiers, the system comprising:
at least one computing device providing an interface for accessing an object stored in the object addressable storage system, the computing device being configured to manage storage of objects such that an object comprising a plurality of portions is stored with each of the plurality of portions in a respective storage tier of the plurality of storage tiers based on a respective value of a parameter specified for each of the plurality of portions.

16. The object addressable storage system of claim 15, wherein:
the value of the parameter specifies whether the respective portion is binding or non-binding.

17. The object addressable storage system of claim 16, wherein:
a first storage tier of the plurality of storage tiers comprises content addressable storage and the interface is configured to select the first storage tier for storage of portions of objects having a value of the parameter indicating the respective portion is binding.

18. The object addressable storage system of claim 17, wherein:
a second storage tier of the plurality of storage tiers comprises block storage and the interface is configured to select the second storage tier for storage of portions of objects having a value of the parameter indicating the respective portion is non-binding.

19. The object addressable storage system of claim 18, wherein:
the interface is configured to migrate a respective portion of an object between storage tiers in response to a value of the parameter changing.

20. The object addressable storage system of claim 19, wherein:
the interface is configured to respond to a command to read an object by assembling the object from portions read from multiple tiers of the plurality of storage tiers.

* * * * *